Sept. 13, 1960 H. A. G. STONE 2,952,822

RADIO FREQUENCY TRANSFORMER

Filed May 1, 1959

INVENTOR,
HARRISON A.G. STONE
BY
Harry M. Saragovitz
ATTORNEY.

United States Patent Office
2,952,822
Patented Sept. 13, 1960

2,952,822

RADIO FREQUENCY TRANSFORMER

Harrison A. G. Stone, Belmar, N.J., assignor to the United States of America as represented by the Secretary of the Army Filed May 1, 1959, Ser. No. 810,514

9 Claims. (Cl. 333—32)

(Granted under Title 35, U.S. Code (1952), sec. 266)

The invention described herein may be manufactured and used by or for the Government for governmental purposes, without the payment of any royalty thereof.

This invention relates to a coupling device having inherent capabilities for efficiently transferring energy from one system to another wherein the systems are themselves each unbalanced, that is to say, in each system one terminal is at ground potential while the other terminal is at some higher potential.

The invention accomplishes the transfer of energy while providing a substantial increase in impedance. The impedance gain may be as high as 1 to 4.

A vital feature of the transformer is its ability to function over an extremely wide band of frequencies. For example, from 40 mc./s. to 400 mc./s. have been covered with no greater deviation than an allowable 2 to 1 standing wave ratio. Moreover, this transformation may be made to occur over a wide band of frequencies with low losses, and without the use of tuning or adjustments of any kind over the entire range of frequencies.

The invention provides a successful solution for a difficult problem which has heretofore been circumvented but not solved by the use of inefficient devices. The problem in its broad aspect is to provide efficient coupling between two circuits, the terminals of each of which are at different potentials. The operating characteristics of the coupling device of the invention are such that, not only is efficient coupling achieved, but the same favorable transfer of energy takes place with substantially uniform results spread over an extremely wide band of frequencies. A still further and no less important feature of the invention is the facility with which the device may be designed to provide high or low impedance ratios with which to match impedances of the one circuit to that of the other.

All of the above characteristics are combined with the exceptional ability of the device to function with substantially uniform low loss throughout a wide band of frequencies.

The basic structure of the transformer includes a pair of spaced coil forms of insulating material mounted within a shield. The coils are wound upon the supports in helical configuration and consist of a pair of slightly separated parallel conductors which constitute bifilar windings. The windings are arranged to present unbalanced input and output terminal pairs for connection between two unbalanced electrical systems to be coupled by the transformer. A more detailed description will appear hereinafter.

It is a primary object of the invention to provide a radio frequency transformer for efficiently transferring energy from one circuit to another wherein both circuits present electrically unbalanced pairs of terminals to the transformer terminals.

A further object of the invention is to provide a radio frequency transformer which functions throughout a wide band of frequencies without deviation from a highly efficient standard of performance.

A further object of the invention is to provide a wideband unbalance to unbalance radio frequency transformer capable of providing an impedance ratio between the coupled circuits as high as 1 to 4.

A further object of the invention is to provide a radio transformer in which its inherent capabilities are effective without tuning or adjustment.

Other objects and features of the invention will more fully appear from the following description and will be particularly pointed out in the claims.

To present a better understanding of the invention a specific embodiment thereof will be described and illustrated in the accompanying drawings wherein.

Figure 1:
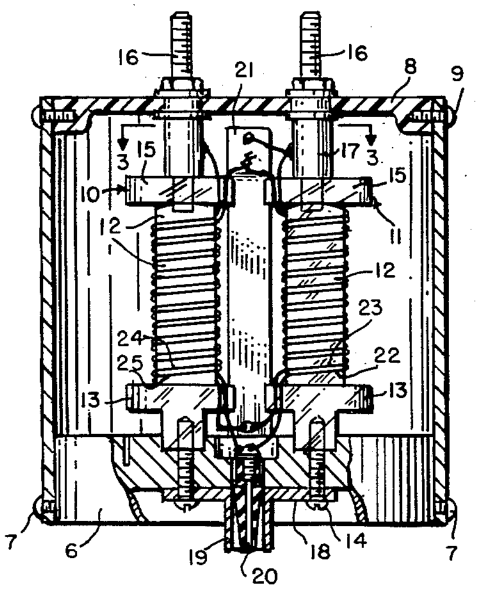
Fig. 1 is a side view of the device partially in cross section.
Figure 2:
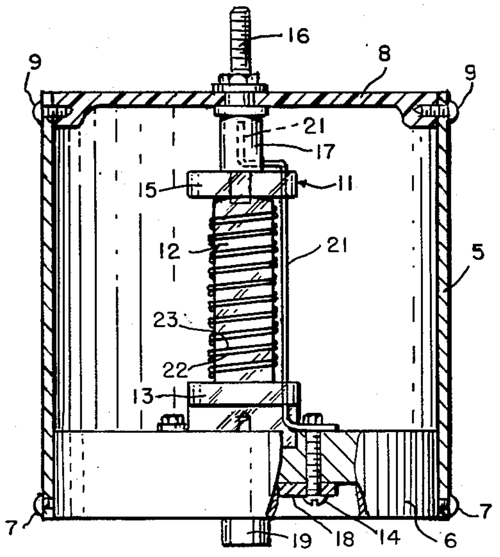
Fig. 2 is a view similar to Fig. 1 with the device rotated 90°.
Figure 3:
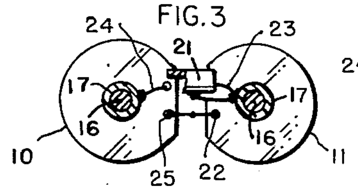
Fig. 3 is a top view of the device of Fig. 1 along line 3—3.

The structural features of the invention provide flexibility in designing the transformer to function in a wide range of frequency bands and to accurately meet and indefinitely maintain its operating characteristics. The transformer windings are inclosed in a metallic shield 5 which may be of any suitable construction. A desirable construction is shown in Fig. 1 wherein the shield is a hollow metallic cylinder which fits closely upon a metallic circular base member 6 and extends upward to a point above the coils and desirably is secured to the base by screws 7 or other suitable means. The base serves as the lower inclosure for the shield as well as the main support for the transformer windings as will appear hereinafter. The top of the shield is closed by means of a disc 8 of insulating material secured in the upper end of the cylinder by screws 9 or other suitable means.

The windings of the transformer are supported upon a pair of coil forms 10 and 11 of low loss insulating material such as Teflon polystyrene or Lucite. The coil forms are identical and are rigidly secured to the base 6 in spaced relation with their axes parallel and equally distant from the shield. The forms are generally spool-like in configuration having a cylindrical body 12 to receive the coil windings and top and bottom end portions of enlarged diameter. The bottom end portions 13 are desirably held rigidly within recesses formed in the base 6 and secured by screws 14. The top end portions 15 are recessed to tightly receive output terminals 16 and 17 which extend upward through the disc 8 and are provided with suitable means for connection to a circuit.

The input to the transformer is supplied by a coaxial cable which has detachable connection with a conventional coaxial plug connector 18 which is received in an aperture drilled through the center of the base 6. The plug connector is fixed to the base by screws or any suitable means which provides good electrical connection between the base and the outer member 19 of the coaxial system.

The inner member 20 of the coaxial plug 18 projects into the space within the shield and provides the high voltage connection for the windings while ground potential is maintained throughout the base, the shield and the outer member of the coaxial input cable. Other means than a coaxial cable may, however, be provided to conduct input energy to the transformer. It is also possible to provide coaxial transfer of energy from the output terminals.

An additional element is provided in the form of shunting bus bar 21 which is rigidly electrically connected at one end to the base member 6 and may desirably be fastened by one of the screws which secure the plug 18 to the base. The bar 21 extends upward parallel to the axes of the coil forms and is spaced equal distances therefrom. The upper end of the bar terminates at or slightly beyond the upper end of the coil forms and is mechanically supported at this point by insertion of the edges of the bar into slots, provided for the purpose in the upper enlarged portions 15 of the coil forms. The provision of the above supporting means for the bar 21 is not essential but is desirable.

The transformer windings are of special design. Each coil form has two separated conductors wound thereon in spaced helical configuration to form bifilar windings which are connected to provide unbalanced input and unbalanced output. The uniformity of the spacing of the conductors is held to close tolerance. Also the pitch of the helix is accurately uniform and held to a predetermined value commensurate with the number of turns and the diameter of the coil forms to provide the required values of inductance, impedance and distributed capacity for a device having operating characteristics which cover a desired frequency bandwidth.

Figure 5:
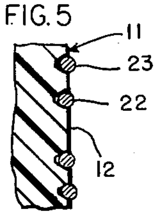
Fig. 5 is a detailed view of the transformer construction.

This high order of precision in forming the coils may be obtained in various ways. A satisfactory procedure is to cut shallow helical grooves in the coil form to receive the wires as shown in Fig. 5. The grooves may be cut in a thread cutting lathe or equivalent machine. One groove is cut to accurate depth throughout the length of the coil form with the lathe adjusted to provide the required helical pitch. The lathe cutting tool is then adjusted along the lathe axis the distance of the spacing between the parallel conductors and the second groove is cut.

It has been found that the slots formed in the coil forms 11 and 12 to receive the transformer windings desirably are formed with sloping side walls and a flat bottom wall similar to the shape of an "Acme" type screw thread and so proportioned that the wire received therein will closely approach but not contact the bottom wall thereof while contacting only the side walls.

The conductors, which desirably may be copper wire of the required size, are then wound upon the forms in the grooves thus cut and held therein in any suitable manner, such as cementing them in place with insulating cement. The ends of the wires are then connected to the terminals of the device by soldering or by other low impedance connecting means.

The inner conductor 20 of the coaxial cable is connected to the lower end of one of the windings, for example, the winding 22 on coil form 11. The upper end of this winding is connected to the upper end of the winding 25 on coil form 10 while the lower end of the winding 25 is connected to the outer member 19 thru the bar 21 and base 6 of the coaxial input connector which is at ground potential. The inner member 20 of the connector is also connected to the lower end of the winding 24 while its upper end is connected to the output terminal 16. The winding 23 is connected at its lower end to the grounded outer member 19 of the coaxial cable. The upper end of this winding is connected to the output terminal 17. The ends of the shunting bar 21 are connected to opposite ends of the winding 23.

Figure 4:
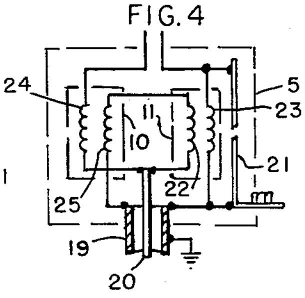
Fig. 4 is a circuit diagram of the device of the invention.

Transformers constructed in accordance with the invention, have been made to cover various bands of frequencies having a 10 to 1 range. Test data obtained from a device constructed in accordance with the invention exhibited a gain in impedance of 1 to 4 and performs with relatively low loss. This test data is presented in graph form in Fig. 4. The graph indicates the device functioned well within an allowable standing wave ratio of 2.0 throughout a frequency range of from 40 mc./s. to 400 mc./s. In the test, the transformer was connected between two unbalanced electrical systems.

Relative to the theoretical considerations concerning the operation and design of the device it should be observed that the structure departs from the generally accepted design for such apparatus in that one of the windings of one bifilar coil is shunted by a low impedance member 21 which would appear to render this winding ineffective. It has been found, however, that the device will not function without this shunted winding.

An explanation of the operation of the device can not be based solely upon lumped constant circuit parameters. The device must instead be treated as a distributed line transformer. This assumption then implicitly implies that the behavior of the device is not that of a distortionless transmission line.

The apparent length of the device must be considered constant in terms of an electrical wavelength throughout the range of its operation to explain its operability over a 10 to 1 frequency range. A precedent for this restriction is exhibited by a $T_o$ mode helix antenna and also by a helical center conductor coaxial transmission line. The equations which describe the operation of the $T_o$ mode helix provide a lead in the approach to a set of design relationships which can be employed in predicting the structure and operation of this device of the invention.

The indicated relationships which should be considered are as follows. The spacing of the conductors forming a pair of bifilar windings must be chosen on the basis of a pair of windings semi-immersed in a dielectric medium whose characteristic impedance should be arranged to meet the requirement that it is equal to the square root of the product of the terminal input and terminal output impedances which the device sees. The spacing between the two forms is chosen on the basis of an impedance relationship which is that of a balanced pair of current sheets in a grounded shield. On this basis predictions were made for a specific device which were borne out quite accurately in practice.

Based on the above considerations the predicted parameters for the specific device indicated 6.12 turns per inch of number 18 wire upon a coil form which was capable of receiving a coil 3.81 inches long. Thus the total number of turns predicted was 23.3. The spacing of the wires in their bifilar relation was .034 inch, the spacing of the coil forms was determined to be .875 inch between centers and the diameter of the shield can was to be 3 inches. This device was intended to operate at from 20 to 200 megacycles.

Figure 6:
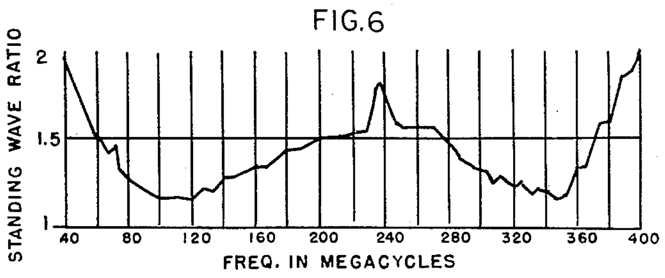
Fig. 6 is a graph showing typical electrical performance of the device.

When built and adjusted for best operation the device employed 23 turns of number 18 wire on each coil form at the bifilar spacing indicated above. The coil form had 6 turns per inch and was 4 inches long. The shield can was found to provide optimum results when 2.8 inches in diameter instead of 3 inches. This device operated at a voltage standing wave ratio of less than 2 to 1 from 20 to 200 megacycles. The operating characteristics followed generally that predicted and showed the same highly desirable capabilities as that of the device whose output is illustrated in Fig. 6.

Other unbalance type transformers were successfully built in accordance with the invention to function at various frequency ranges and to function in connection with various input and load impedances.

What is claimed is:

1. A radio frequency transformer comprising first and second coil forms each having bifilar windings thereon which constitute the windings of the transformer, a metallic shield inclosing said windings, a pair of input and a pair of output terminals, one coil on said first coil form and one coil on said second coil form being connected in series between said input terminals, the other coil on said second coil form being connected in series between the other input terminal and one output terminal, the other coil on said first coil form being connected between ground potential and the second output terminal and a shunting bus bar having its ends connected to the ends of the said latter coil.

2. A radio frequency transformer for coupling two unbalanced electrical systems comprising first and second coil forms of low loss insulation each having two separated parallel conductors wound thereon in spaced helical configuration which constitute the windings of the transformer, a metallic shield inclosing said windings and having a ground potential connection, a coaxial connecting means for supplying input energy and a pair of output terminals, one coil on said first coil form and one coil on said second coil form being connected in series between the inner and outer conductors of said coaxial connector, the other coil on said second coil form being connected in series between the inner conductor of said coaxial connector and one of said output terminals, the other coil on said second coil form being connected in series between the outer conductor of said coaxial connector and the other output terminal, the other coil on said first coil form being connected between ground potential on the second output terminal and a shunting bus bar having its ends connected to the ends of the said latter coil.

3. A radio frequency transformer for coupling two unbalanced electrical systems comprising first and second coil forms of low loss insulation each having two separated parallel conductors wound thereon in spaced helical configuration which constitute the windings of the transformer, a metallic base member upon which said coil forms are rigidly secured in spaced parallel relation, a metallic shield inclosing said coils and having electrical connection with said base, said base and shield having a ground potential connection, a pair of input and a pair of output terminals, one coil on said first coil form and one coil on said second coil form being connected in series between said input terminals, the other coil on said second coil form being connected in series between the high potential input terminal, and the high potential output terminal, the other coil on said first coil form being connected in series between the ground potential input terminal and the ground potential output terminal and a shunting bus bar having its ends connected to the ends of said latter coil.

4. A radio frequency transformer comprising first and second coil forms supported in spaced parallel position, each coil form having formed therein a pair of separated parallel surface grooves of spaced helical configuration extending substantially the full length of the forms, pairs of wires for each form received in said grooves to form the windings of the transformer, a metallic shield inclosing said windings and having a ground potential connection, a pair of input and a pair of output terminals, one coil on said first coil form and one coil on said second coil form being connected in series between said input terminals, the other coil on said second coil form being connected in series between the high potential input terminal and the high potential output terminal, the other coil on said first coil form being connected in series between the ground potential input terminal and the ground potential output terminal and a shunting bus bar having its ends connected to the ends of said latter coil.

5. A radio frequency transformer according to claim 4 and wherein the input terminals thereof are in the form of a coaxial connecting means.

6. A radio frequency transformer according to claim 1 and in which the impedance ratio thereof is at least 1 to 4.

7. A radio frequency transformer according to claim 3 and wherein the said shunting bus bar is parallel to the said coil forms and is rigidly supported at one end on said base member and at its other end is attached to the upper end portions of the said coil forms.

8. A radio frequency transformer comprising first and second coil forms of low loss insulation each having two separated parallel conductors wound thereon in spaced helical configuration to constitute the windings for the transformer, means to rigidly secure the conductors in accurate uniformly spaced relation throughout their length, a metallic shield inclosing said windings and having a ground potential connection, a metallic base member, means to secure said coil forms in parallel spaced relation on said base, a metallic shield inclosing said windings and electrically connected to said base, a coaxial connecting means for supplying input energy, the inner conductor of said means extending centrally through said base to a point close to said windings, a pair of output terminals supported on said coil forms, one coil on said first coil and one coil on said second coil form being connected in series between the said inner connector of said coaxial connecting means and the outer conductor thereof, the other coil on said second coil form being connected in series between the inner conductor of said coaxial connector and one of said output terminals, the other coil on said first coil form being connected in series between the outer conductor of said coaxial connector and the other output terminal, and a shunting bus bar connected at its ends to the ends of said latter coil.

9. A radio frequency transformer according to claim 8 together with a disc of insulation closing the top of said shield and through which said output terminals extend.

References Cited in the file of this patent

UNITED STATES PATENTS 2,791,585 Delong -------------- Nov. 20, 1956

FOREIGN PATENTS 590,203 Great Britain ---------- July 10, 1947